Figure 1:
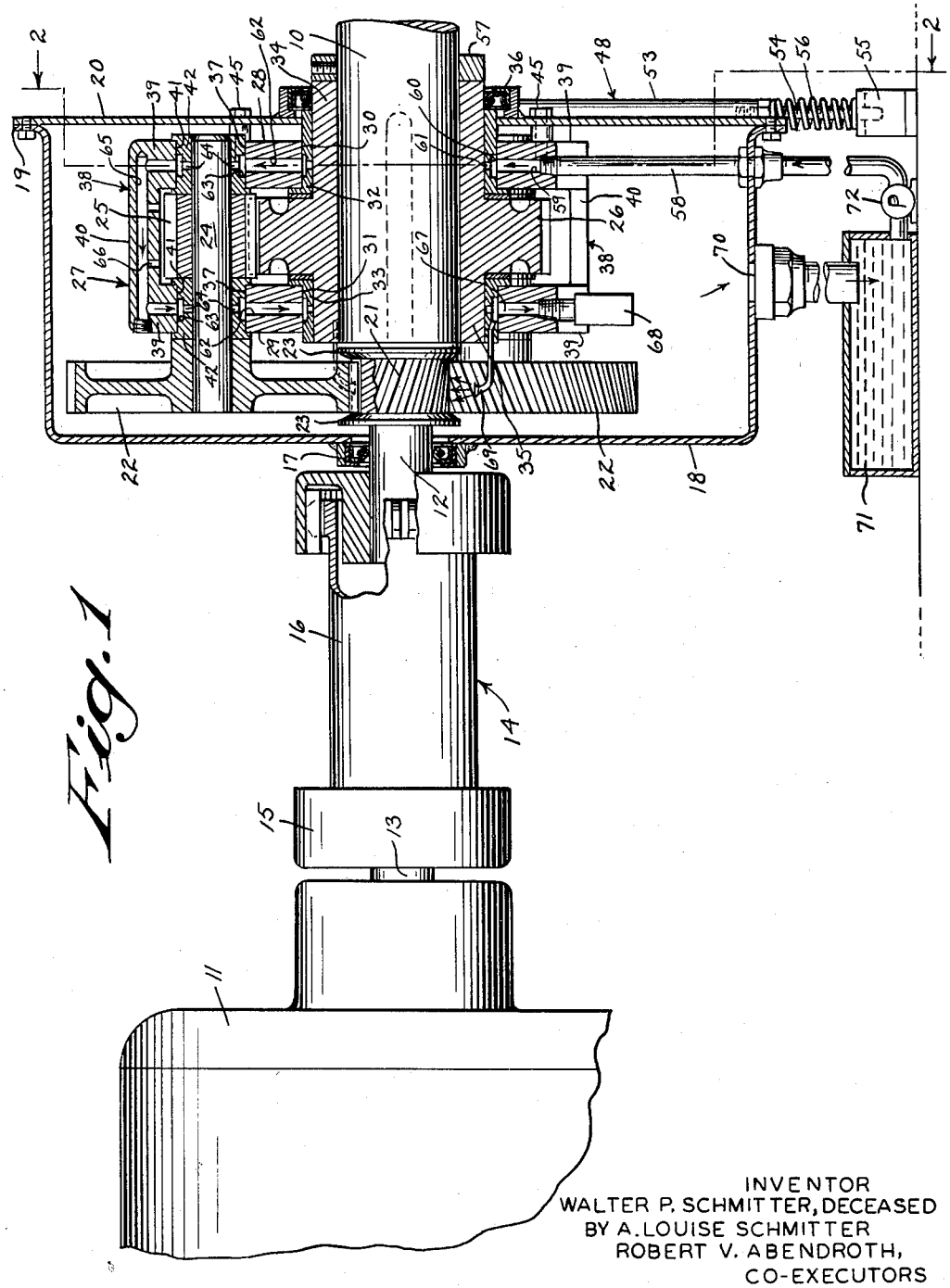

Sept. 1, 1964 W. P. SCHMITTER 3,146,629
HIGH SPEED SHAFT MOUNTED DRIVE
Filed Jan. 8, 1963 2 Sheets-Sheet 1

INVENTOR
WALTER P. SCHMITTER, DECEASED
BY A. LOUISE SCHMITTER
ROBERT V. ABENDROTH,
CO-EXECUTORS

BY Thomas W. Ehrmann

ATTORNEY

INVENTOR
WALTER P. SCHMITTER, DECEASED
BY A. LOUISE SCHMITTER
ROBERT V. ABENDROTH
CO-EXECUTORS

BY Thomas W. Ehrmann

ATTORNEY

Patented Sept. 1, 1964

3,146,629
HIGH SPEED SHAFT MOUNTED DRIVE
Walter P. Schmitter, deceased, late of Wauwatosa, Wis., by A. Louise Schmitter, Wauwatosa, and Robert V. Abendroth, Whitefish Bay, Wis., co-executors, assignors to The Falk Corporation, Milwaukee, Wis., a corporation of Wisconsin
Filed Jan. 8, 1963, Ser. No. 250,187
8 Claims. (Cl. 74—410)

This invention relates to shaft mounted drives, and particularly to a multiple train, high speed shaft mounted speed reducer in which the intermediate gearing of the multiple trains is supported by a spider assembly which in turn is supported upon a low speed gear having a hollow portion adapted to receive the drive shaft of the machine to be driven thereby. This invention further resides in the provision of an integral lubrication system within said spider assembly for supplying lubricant to journals and to all meshing gearing.

In shaft mounted drives, especially those adapted for high speed operation, it is most desirable to divide the input torque through a plurality of gear trains which mesh with a driven low speed gear at equally annularly spaced positions about the low speed gear so that the load on the intermediate gearing, shafts and bearing is reduced. However, one requirement in the use of a plurality of gear trains is the provision of ease of assembly and disassembly of the gearing while retaining a rigid mounting for the gearing. In the speed reducer of this invention, the intermediate gearing comprising the multiple gear trains is removably supported in a spider assembly including a pair of axially spaced side frames both mounted on the low speed gear and cap pieces which retain the side frames in their spaced relation as well as removably mount the shafts of the intermediate gearing. Not only is a rigid mounting of the gearing thereby provided but the housing of the speed reducer functions primarily as an enclosure and is not required to sustain substantial loads.

In high speed operation of speed reducers, it is necessary to provide positive lubrication of journals and meshing gearing. The speed reducer of this invention includes an integral lubrication system comprising internal passages in the spider assembly and which permits the supply of lubricant under pressure to journals and to all meshing gearing.

Accordingly, it is a principal object of this invention to provide a shaft mounted speed reducer having a plurality of divided load gear trains in which the intermediate gearing comprising the gear trains is supported by a low speed gear adapted to receive the drive shaft of a machine to be driven thereby.

It is another object of this invention to provide such a shaft mounted speed reducer in which the mounting for such intermediate gearing is a spider assembly that includes axially spaced side frames and spanning cap pieces forming a rigid mounting and permitting ease of assembly and disassembly of the intermediate gearing in the supporting spider assembly.

It is a further object of this invention to provide such a shaft mounted speed reducer having an integral pressure lubricating system which supplies lubricant to journals and to all meshing gearing.

It is also an object of this invention to provide a shaft mounted speed reducer having a housing which functions to enclose the gearing and which is not subjected to any substantial load.

It is a further object of this invention to provide torque reaction means attached to the housing of a shaft mounted speed reducer at diametrically opposed positions on the housing to retain the same against rotation and relieve the drive shaft of the machine to be driven by the speed reducer from reactive torque forces.

The foregoing and other objects will appear in the description to follow. In the description, reference is made to the accompanying drawings which form a part hereof and in which there is shown by way of illustration a specific form in which this invention may be practiced. This form will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense and the scope of the present invention is best defined by the appended claims.

Figure 2:
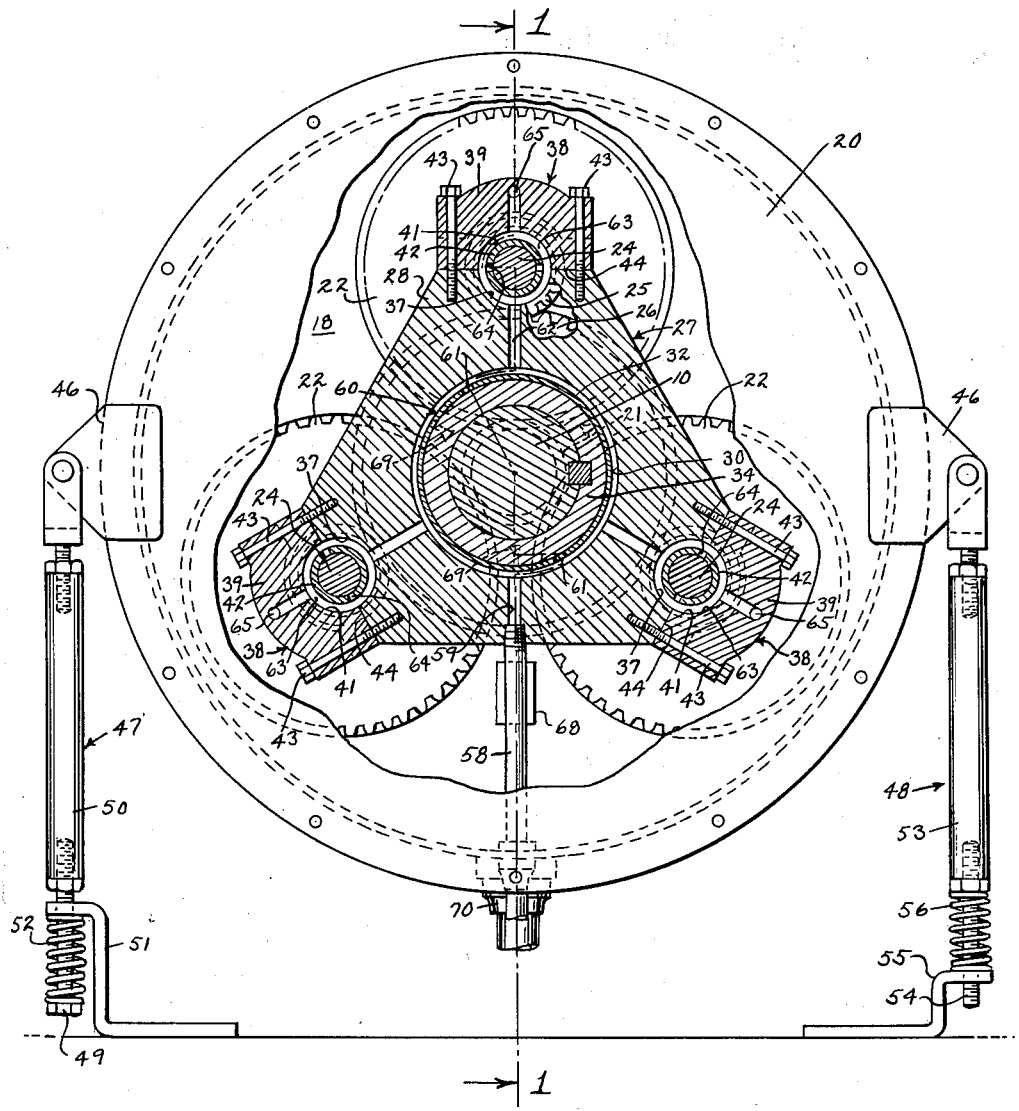

In the drawings:

FIG. 1 is a view in vertical section of a shaft mounted speed reducer in accordance with this invention and shown coupled to a prime mover, and FIG. 2 is a view in elevation and partly in section taken in the plane of line 2—2 of FIG. 1.

Referring to FIGS. 1 and 2, the shaft mounted speed reducer of this invention is adapted for mounting upon a drive shaft 10 of a machine to be driven, and provides reduction in speed from the output of a prime mover 11. The speed reducer includes an input shaft 12 connected to an output shaft 13 of the prime mover 11, and the connection is preferably made through a double acting dental coupling 14 of well known construction and operation. The coupling 14 includes a pair of internally splined hubs 15 each keyed to a respective one of the output shafts 13 of the prime mover 11 and the input shaft 12 of the speed reducer, and a sleeve 16 which is externally splined at its ends engages the internal splines in the hubs 15 to transmit torque between the shafts 13 and 12. The double acting flexible coupling 14 permits axial and radial movement of the input shaft 12 and also accommodates angular misalignment of the input shaft 12 relative to the output shaft 13 of the prime mover.

The input shaft 12 extends through an oil sealing ring 17 mounted outboard of a cup shaped cover 18 which has a flanged portion 19 secured to a back plate 20 by screws at spaced intervals around the periphery of the flange 19. The cover 18 and the back plate 20 form a housing for the speed reducer. A high speed helical pinion 21 is mounted on the input shaft 12 within the housing and meshes with three identical intermediate helical gears 22 that are spaced equally about the high speed pinion 21. The input shaft 12 is free to float both radially and axially and is centered and positioned by the tooth reactions between the three intermediate gears 22 and the high speed pinion 21. As shown in FIG. 1, the high speed pinion 21 has a face width which slightly exceeds the face width of the intermediate gears 22. A pair of thrust rings 23 are press fitted about the input shaft 12 on each side of the high speed pinion 21 to restrict the amount of axial movement of the high speed pinion 21 to the difference in face widths of the meshing gears. The high speed pinion 21 may be described as a floating pinion in that the flexible coupling 14 permits the high speed pinion 21 to adjust itself axially, radially and angularly so as to divide the load equally among the intermediate gears 22.

In general, the intermediate gears 22 are each mounted on an outboard portion of an intermediate shaft 24 and the three intermediate shafts 24 also mount intermediate helical pinions 25 on inboard portions thereof. The three intermediate pinions 25 mesh with a low speed helical gear 26 which is hollow to receive the machine drive shaft 10. The intermediate shafts 24 are supported by a spider assembly 27 which in turn is supported by the low speed gear 26.

Specifically, the spider assembly 27 includes a pair of axially spaced side frames 28 and 29 provided with coaxial central bores 30 and 31, respectively. Low speed gear bushings 32 and 33 are fitted within the central bores 30 and 31, respectively, and the bushing 32 mounted in the side frame 28 adjacent the back plate 20 is journaled through an opening in the back plate 20. The low speed gear 26 includes hub portions 34 and 35 on respective sides of the toothed portion of the gear 26 and the hub portions 34 and 35 are journaled for rotation in the low speed gear bushings 32 and 33, respectively. The hub portion 34 extends outwardly through the back plate 20 and is provided with an oil sealing ring 36 mounted outboard of the back plate 20.

The side frames 28 and 29 are each formed with bearing surfaces 37 at three equally annularly spaced positions about the outer periphery of the side frames 28 and 29. Three cap pieces 38 span the space between the frames 28 and 29, and each cap piece 38 includes a mounting portion 39 at each end and a spacer portion 40 therebetween. The mounting portions 39 are each provided with a bearing surface 41 that cooperates with the bearing surfaces 37 of the side frames 28 and 29 to form axial openings through the spider assembly 27. Intermediate gear bushings 42 are straddle mounted in each of the axial openings and between the cap pieces 38 and a respective side frame. Each cap piece 38 is scured at its ends to both side frames 28 and 29 by studs 43 which extend radially through the mounting portions 39 and are threadedly received within the side frames 28 and 29. The intermediate shafts 24 are journaled for rotation in the bushings 42, and the cap pieces 38 complete the spider assembly 27 and retain the side frames 28 and 29 of such assembly in spaced axial relation. It should be noted that the planes of cleavage 44 between the cap pieces 38 and the side frames 28 and 29 are tangential and are parallel to the normal axis of the input shaft 12 and the axis of the low speed gear 26.

The entire spider assembly 27 is secured against rotation to the back plate 20 of the housing by studs 45 which pass through the back plate 20 and are threadedly received within the side frame 28, with spacers maintaining a proper distance between the interior of the back plate 20 and the side frame 28.

A pair of ears 46 are attached to the back plate 20 of the housing at diametrically opposed positions on its periphery. Torque rod assemblies 47 and 48 are each pivotally mounted at one end upon an ear 46. The torque rod assembly 47 includes a stud 49 threadedly received at one end in a rod 50 and extending through an opening in a mounting bracket 51, which bracket 51 is secured to a suitable foundation. A compression spring 52 is biased between the head of the stud 49 and the undersurface of the mounting bracket 51 so that upward movement of the torque rod assembly 47 will be resisted. Conversely, the torque rod assembly 48 includes a rod 53 having a guide rod 54 of lesser diameter extending from its bottom and through an opening in another mounting bracket 55 which is also secured to a suitable foundation. A compression spring 56 is biased between a top surface of the bracket 55 and the bottom end of the rod 53 so that the torque rod assembly 48 resists downward movement thereof. The torque rod assemblies 47 and 48 prevent rotation of the housing of the speed reducer by counteracting the reactive forces that are transmitted to the housing during operation of the speed reducer. Obviously, the torque rod assemblies 47 and 48 must be properly arranged in terms of the direction of rotation of the input shaft 12. The arrangement of the torque rod assemblies 47 and 48 shown in FIG. 2 corresponds to a counterclockwise direction of rotation of the input shaft 12 as viewed in FIG. 2. The torque rod assemblies 47 and 48 establish cancelling reactions on the housing of the speed reducer thereby relieving the machine drive shaft 10 from torque reaction loads. Since a pair of torque rods are used, care must be taken in the mounting of the torque rods between the housing and foundation so as not to deform or otherwise pre-stress the housing. The resilient character of the assemblies 47 and 48 will insure that such pre-stressing does not occur.

In operation, the driving torque that is transmitted from the prime mover 11 through the double acting flexible coupling 14 to the input shaft 12 is divided equally between the three gear trains. A first reduction in speed is accomplished by the meshing high speed pinion 21 and the three intermediate gears 22. The three intermediate pinions 25 jointly drive the low speed gear 26 and a second reduction in speed is accomplished. The driving of the low speed gear 26 drives the machine drive shaft 10 which is keyed therein and is axially restrained by a set collar 57.

It will be appreciated from the above that the intermediate gearing of the multiple gear trains is mounted in a rigid support which in turn is supported by the shaft mounted low speed gear 26. The housing, which is also supported by the low speed gear 26, is freed from carrying the weight of the gearing and is unaffected by the torque loads imposed by the gears and shafts whereby the housing may be inexpensively formed to function primarily as an enclosure. The mounting of the intermediate gearing readily permits assembly and disassembly thereof.

The shaft mounted drive of this invention is especially suited for high speed operation. The input speed with which this unit is operable may run as high as 8000 r.p.m. with an output speed of 1200 r.p.m. obtained by using common gear reduction ratios. Because of the high speed capability and operation, it is desirable to pressure lubricate the shaft mounted speed reducer and this has been accomplished in a novel manner. Specifically, an inlet pipe 58 extends through the cover 18 and is threadedly received at its end in the bottom of the side frame 28 where it communicates with a radial inlet passage 59 that extends to the central bore 30 in the side frame 28. The inlet passage 59 communicates with an annular passage 60 which is formed by an annular recess in the outer periphery of the low speed gear bushing 32, and bleeder holes 61 lead from the annular passage 60 to the inner surface of the bushing 32 to supply lubricant to the journalled surfaces of the bushing 32 and hub portion 34 of the low speed gear 26. Radial internal passages 62 in the side frame 28 lead from the central bore 30 to each of the bearing surfaces 37 provided at the three supports for the intermediate shaft bushings. Such radial passages 62 communicate with annular passages 63 formed by annular recesses in the outer surfaces of each of the intermediate shaft bushings 42. Bleeder holes 64 again lead from such annular passages 63 to the journaled intermediate shafts 24.

Each of the cap pieces 38 has a continuous passage 65 extending between the bearing surfaces 41 at each end and formed by a pair of radial internal bores and an axial bore capped at one end, as shown in FIG. 1. The continuous passages 65 connect the annular passages 63 of the associated intermediate shaft bushings 42. Spray holes 66 communicate radially with the continuous passages 65 to supply lubricant to the intermediate gears 25.

The side frame 29 is identical to the side frame 28 in that there is provided radial passages 62 extending from the bearing surfaces 37 to the central bore 31 and communicating with the annular passage 60 in the low speed gear bushing 33, which is also provided with bleeder holes 61. However, a radial passage 67 corresponding to the inlet passage 59 of the side frame 28 communicates with a pressure relief valve 68 having a shank threaded in the side frame 29. Three hollow spray bars 69 are threadedly received within the bushing 33 and communicate with the annular passage 60 formed therein to supply lubricant to the three intermediate gears 22. The housing cover 18 is provided with a drain outlet 70. Any suitable means for providing lubricant under pressure to the inlet pipe 58 may be employed and a simple system is shown including a reservoir 71 and a pump 72.

It will be apparent from the above that lubricant under pressure enters the speed reducer through the inlet pipe 58 where it is carried to the annular passage 60 in the low speed gear bushing 32 by the inlet passage 59. The oil is distributed thereafter to each of the supports for the intermediate shafts 24 through the radial passages 62 and then through the annular passages 63 to the continuous passages 65 in the cap pieces 38 which distribute the lubricant to the side frame 29. From the annular passages 63 in the side frame 29, the oil returns through the radial passage 62 to the annular passage 60 in the low speed bushing 33 where it is distributed to the meshing high speed pinion and intermediate gears through the medium of the spray bars 69. The oil then returns through the outlet 70 to the reservoir 71. It will be seen that the novel lubrication system provides lubricant under pressure to all mating gears as well as the journaled surfaces. This is accomplished simply and without expensive accessory equipment.

What is claimed is:

1. The combination with a prime mover having an output shaft and a double articulating flexible coupling mounted at one end upon said output shaft of a speed reducer adapted for mounting on the drive shaft of a machine driven thereby, said speed reducer comprising: a housing having coaxial openings in opposite walls thereof; an input shaft extending through the opening in one wall of said housing and mounting the other end of said coupling; a high speed pinion mounted on said input shaft within said housing; a spider assembly including a pair of side frames and spanner means secured to each of said side frames and retaining said side frames in fixed axially spaced relation, one of said side frames being secured against rotation to the opposite wall of said housing and said side frames each having a central axial bore; a plurality of intermediate shafts journaled in said spider assembly in parallel relationship and equally annularly spaced from each other, said intermediate shafts each having an inboard portion and an outboard portion; an intermediate gear mounted on the outboard portion of each of said intermediate shafts in meshing engagement with said high speed pinion, said high speed pinion being free to float radially to thereby distribute between the intermediate gears the torque load imposed on the high speed pinion; an intermediate pinion mounted on the inboard portion of each of said intermediate shafts; a low speed gear journaled in the central bores of said side frames and in meshing engagement with said intermediate pinions, said low speed gear having a hollow portion adapted to receive the machine drive shaft; and torque reaction means attached to said housing for retaining the same against rotation.

2. The combination with a prime mover having an output shaft and a double articulating flexible coupling secured at one end to said output shaft of a speed reducer adapted for mounting on the drive shaft of a machine driven thereby, said speed reducer comprising: a housing having coaxial openings in opposite walls thereof; an input shaft extending through the opening in one wall of said housing and mounting the other end of said coupling for radial and axial movement of the input shaft; a high speed pinion mounted on said input shaft within said housing; a spider assembly including a pair of side frames and spanner means secured to each of said side frames and retaining said side frames in fixed axially spaced relation, one of said side frames being secured against rotation to the opposite wall of said housing and said side frames each having a central axial bore; three intermediate shafts journaled in said spider assembly in parallel relationship and equally annularly spaced from each other, said intermediate shafts each having an inboard portion and an outboard portion; an intermediate gear mounted on the outboard portion of each of said intermediate shafts in meshing engagement with said high speed pinion; thrust rings mounted on said input shaft on each side of said high speed pinion and engageable with said intermediate gears to limit axial movement of said input shaft; an intermediate pinion mounted on the inboard portion of each of said intermediate shafts; a low speed gear journaled in the central bores of said side frames and in meshing engagement with said intermediate pinions, said low speed gear having a hollow portion adapted to receive the machine drive shaft and which hollow portion extends through the opening in the opposite wall of said housing to support said housing; and torque reaction means attached to said housing for retaining the same against rotation.

3. The cmbination with a prime mover having an output shaft and a coupling mounted at one end upon said output shaft of a speed reducer adapted for mounting on the drive shaft of a machine driven thereby, said speed reducer comprising: a housing having coaxial openings in opposite walls thereof; and input shaft extending through the opening in one wall of said housing and mounting the other end of said coupling; a high speed pinion mounted on said input shaft within said housing; a spider assembly comprising a pair of axially spaced side frames and a plurality of cap pieces spanning the space between said side frames and secured at each end upon the periphery of a respective side frame to define tangential planes of cleavage with said side frames, said cap pieces being equally annularly spaced about said side frames, one of said side frames being secured against rotation to the opposite wall of said housing and each of said frames having a central axial bore; an intermediate shaft journaled in said spider assembly at the planes of cleavage defined by each cap piece and said side frames, said intermediate shafts each having an inboard portion between said frames and an outboard portion; an intermediate gear mounted on the outboard portion of each of said intermediate shafts in meshing engagement with said high speed pinion; an intermediate pinion mounted on the inboard portion of each of said intermediate shafts; a low speed gear journaled in the central bores of said side frames and in meshing engagement with said intermediate pinions, said low speed gear having a hollow portion adapted to receive the machine drive shaft; and torque reaction means attached to said housing for retaining the same against rotation.

4. A speed reducer in accordance with claim 3 wherein said torque reaction means comprises a first torque reaction member having resilient means resisting downward thrust and a second torque reaction member parallel to the first torque reaction member and including resilient means resisting upward thrust, said torque reaction members being pivotally secured at one end at diametrically opposed positions on said housing and adapted to establish a reactive couple which opposes the torque reaction forces imposed by the gearing and shafts on said housing.

5. The combination with a prime mover having an output shaft and a coupling mounted at one end upon said output shaft of a speed reducer adapted for mounting on the drive shaft of a machine driven thereby, said speed reducer comprising: a housing having coaxial openings in opposite walls thereof; an input shaft extending through the opening in one wall of said housing and mounting the other end of said coupling; a high speed pinion mounted on said input shaft within said housing; a spider assembly comprising a pair of axially spaced side frames each having three equally annularly spaced bearing surfaces formed on its periphery and three cap pieces spanning the space between said side frames and secured at each end to a respective side frame at a bearing surface of such side frame, said cap pieces having bearing surfaces which cooperate with the bearing surfaces of said side frames to form axial openings through said spider assembly, one of said frames secured against rotation to the opposite wall of said housing and each of said frames having a central axial bore; three intermediate shafts rotatably supported within the axial openings in said spider assembly and each having an inboard portion between said frames and an outboard portion; an intermediate gear mounted on the outboard portion of each of said intermediate shafts and in meshing engagement with said high speed pinion; an intermediate pinion mounted on the inboard portion of each of said intermediate shafts; a low speed gear in meshing engagement with said intermediate pinions and including hub portions journaled in the central bores of said side frames, one of said hub portions extending through the opening in the opposite wall to support the housing and said low speed gear being centrally bored to receive the machine drive shaft in supporting and driving relation therewith; and torque reaction means attached to said opposite wall of said housing to restrain the same against rotation.

6. A speed reducer adapted for mounting on the drive shaft of a machine driven thereby, said speed reducer comprising: a housing having coaxial openings in opposite walls thereof; a sealing ring in said opening in each wall of the housing; an input shaft extending through the sealing ring in one wall of said housing; a high speed pinion mounted on said input shaft within said housing; a spider assembly comprising a pair of axially spaced side frames and a plurality of equally annularly spaced cap pieces spanning the space between said side frames and secured at each end upon the periphery of a respective side frame to define tangential planes of cleavage with said side frames, one of said side frames being secured against rotation to the opposite wall of said housing and said side frames having coaxial central bores; intermediate shaft bushings straddle mounted between said side frames and the ends of said cap pieces at the planes of cleavage, each of such bushings having an annular recess in its outer surface and bleeder holes extending from such recess to the inner surface of the bushing; a plurality of intermediate shafts rotatably supported in said intermediate shaft bushings and each having an inboard portion between said side frames and an outboard portion; an intermediate gear mounted on the outboard portion of each of said intermediate shafts and in meshing engagement with said high speed pinion; an intermediate pinion mounted on the inboard portion of each of said intermediate shafts; a low speed gear bushing fitted within the central bore of each of said side frames, such bushings each having an annular recess in its outer surface and bleeder holes extending from such recess to the inner surface of the low speed gear bushings; a low speed gear journaled for rotation in said low speed gear bushings and in meshing engagement with said intermediate pinions, said low speed gear having a hollow portion adapted to receive the machine drive shaft and which hollow portion extends through the sealing ring in the opposite wall of said housing; one of said side frames having a lubricant inlet passage extending radially inwardly from the exterior to its central bore to communicate with the passage formed by the annular recess in the respective low speed gear bushing, each of said side frames having a plurality of radial passages each extending from the central bore to the outer surface of an intermediate shaft bushing to connect the passages formed by the annular recesses in the low speed gear bushing and intermediate gear bushing, and each of said cap pieces having continuous passages between its ends and connecting the passages formed by the annular recesses in the intermediate shaft bushings, whereby lubricant under pressure may be supplied through said inlet passage to the journals for the intermediate shafts and low speed gear; and torque reaction means attached to said housing and restraining the same against rotation.

7. A speed reducer adapted for mounting on the drive shaft of a machine driven thereby, said speed reducer comprising: a housing including a flat back plate and a cup shaped cover removably secured to the back plate at its periphery and having a front wall that is parallel to the back plate, said back plate and front wall having coaxial openings; a sealing ring in the opening in each of the back plate and front wall; an input shaft extending through the sealing ring in the front wall of said cover; a high speed pinion mounted on said input shaft within said housing; a spider assembly comprising a pair of axially spaced side frames and three equally annularly spaced cap pieces spanning the space between said side frames and secured at each end upon the periphery of a respective side frame to define tangential planes of cleavage with said side frames, one of said side frames being secured against rotation to said back plate and each of said frames having a central axial bore; intermediate shaft bushings straddle mounted between said side frames and the ends of said cap pieces at the planes of cleavage; three intermediate shafts rotatably supported in such intermediate shaft bushings in said spider assembly and each having an inboard portion and an outboard portion; an intermediate gear mounted on the outboard portion of each of said intermediate shafts and in meshing engagement with said high speed pinion; an intermediate pinion mounted on the inboard portion of each of said intermediate shafts between said side frames; a low speed gear bushing fitted within the central axial bore of each of said side frames, the bushing mounted in the side frame adjacent said back plate being journaled in the opening in said back plate for support of said housing; a low speed gear including a gear tooth portion disposed between said side frames in meshing engagement with said intermediate gears and a hub portion extending from each side of said gear tooth portion, said hub portions being journaled for rotation within the last named bushings and the hub portion adjacent said back plate extending through the respective sealing ring, said low speed gear being centrally bored to receive the machine drive shaft; and torque reaction means attached to said back plate for restraining said housing against rotation.

8. A speed reducer in accordance with claim 7 wherein each of said bushings is provided with an annular recess in its outer surface and bleeder holes extending from such recess to the inner surface of the bushing, said pair of side frames each having an internal passage extending radially from the exterior to its central bore and communicating with the passage formed by the annular recess in the respective low speed gear bushing, and three internal radial passages each from the central bore to the outer surface of an intermediate shaft bushing and connecting the passages formed by the annular recesses in the low speed gear bushing and the intermediate gear bushing, each of said cap pieces having a continuous internal passage extending between its ends to connect the passages formed by the annular recesses in the intermediate shaft bushings and spray holes extending radially inward from such continuous passage toward the intermediate pinion disposed radially inward thereof, and together with an inlet pipe extending through said housing and connected to the external end of the first named internal passage in said one of said side frames, a pressure relief valve connected to the exterior end of the first named internal passage in the other of said side frames, three hollow spray bars communicating with the annular recess in the low speed gear bushing fitted in said other of said side frames and each having its outlet end directed against a respective one of said intermediate gears, a lubricant drain in the bottom of said housing, and means supplying lubricant under pressure to said inlet pipe for lubrication of the journals of said intermediate shafts and said low speed gear and for lubrication of the meshing gears.

References Cited in the file of this patent

UNITED STATES PATENTS

| | | |
|---|---|---|
| 1,383,706 | Farnum | July 5, 1921 |
| 1,988,338 | Schmitter et al. | Jan. 15, 1935 |
| 2,032,732 | Zerbe | Mar. 3, 1936 |
| 2,091,637 | Hoffman et al. | Aug. 31, 1937 |
| 2,121,214 | Vandervoort | June 21, 1938 |
| 2,235,485 | Jones | Mar. 18, 1941 |
| 2,359,654 | Ligh | Oct. 3, 1944 |
| 2,655,818 | Bodle | Oct. 20, 1953 |
| 2,801,548 | Bade | Aug. 6, 1957 |